(12) United States Patent
Kobayashi

(10) Patent No.: US 7,214,929 B2
(45) Date of Patent: May 8, 2007

(54) FORCE-FEEDBACK INPUT DEVICE

(75) Inventor: Ayumu Kobayashi, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 535 days.

(21) Appl. No.: 10/842,870

(22) Filed: May 11, 2004

(65) Prior Publication Data
US 2004/0233162 A1 Nov. 25, 2004

(30) Foreign Application Priority Data
May 19, 2003 (JP) ............................. 2003-140563

(51) Int. Cl.
*G01D 5/34* (2006.01)
*G09G 5/08* (2006.01)

(52) U.S. Cl. ................... 250/231.13; 345/163

(58) Field of Classification Search .......... 250/231.13, 250/231.14, 231.15, 231.16, 231.17, 231.18; 345/161, 163, 164, 165, 166, 167; 341/9, 341/10, 11, 13, 16
See application file for complete search history.

(56) References Cited

U.S. PATENT DOCUMENTS 6,211,861 B1 * 4/2001 Rosenberg et al. ......... 345/163
6,707,443 B2 * 3/2004 Bruneau et al. ............ 345/156

2001/0017614 A1 8/2001 Osamu et al.

FOREIGN PATENT DOCUMENTS

| EP | 1 035 404 | 9/2000 |
| JP | 2003-50639 | 2/2003 |
| WO | 01/91100 | 11/2001 |
| WO | 03/030092 | 4/2003 |

OTHER PUBLICATIONS

Copy of search report dated Feb. 16, 2007 for corresponding European Patent Application No. 04 01 1679.

* cited by examiner

*Primary Examiner*—Thanh X. Luu
*Assistant Examiner*—Kevin Wyatt
(74) *Attorney, Agent, or Firm*—Brinks Hofer Gilson & Lione

(57) ABSTRACT

A code disk rotates around the shaft fixed to a base in a case. A half of the upper surface of the code disk is exposed from the case. The code disk functions as an operating member on which an operator puts his or her finger to rotate it. A transparent body is layered under the code disk and fixed to the shaft. The transparent body is a circular film member including a piezoelectric element and a transparent electrode. A rotation angle of the code disk is detected by a light emitter and a light receiver. According to the rotation angle, alternating-current is applied to the transparent electrode of the transparent body to drive the piezoelectric element. External force is thus applied to the code disk from the transparent body.

5 Claims, 2 Drawing Sheets

FORCE-FEEDBACK INPUT DEVICE

This application claims the benefit of priority to Japanese Patent Application No. 2003-140563, herein incorporated by reference.

BACKGROUND OF THE INVENTION

1. Field of the Invention

The present invention relates to an input device that outputs an operation signal to operate an electric device, for example, a car-mounted electric device by rotating an operating member manually. More specifically, it relates to a force-feedback input device that gives a predetermined dynamic sensation, that is to say, a force-feedback from an operating member to an operator by applying an external force to the operating member according to a rotation angle thereof.

2. Description of the Related Art

There is known a force-feedback input device including a case; a rotatable operating member, for example, a knob accommodated in the case; a rotary encoder detecting a rotation angle of the knob; an external force applier, for example, a motor applying external force to the knob; and a controller outputting an operation signal to an object of operation and controlling a driving force of the motor, according to the rotation angle of the knob detected by the rotary encoder. This is described in, for example, Japanese Unexamined Patent Application Publication No. 2003-50639.

This force-feedback input device is an input device that outputs an operation signal to operate an electric device, for example, a car-mounted electric device by rotating an operating member manually. The objects of operation are, for example, air flow control and air outlet selection of a car-mounted air conditioner, volume control and tuning of a radio, and volume and tone control of an audio system.

For example, in the case of air flow control of a car-mounted air conditioner, when a knob is rotated in the direction of increasing the air flow, a motor provides the knob with the torque in the opposite direction. The counter torque increases with the increase of the rotation angle of the knob. Through the sensation of resistance (force-feedback) accompanying the increase of the resistance force applied by the knob, an operator can know the rotated angle of the knob in the direction of increasing the air flow.

Besides the above-mentioned force-feedback input device giving the sensation of resistance as force-feedback, there is a force-feedback input device giving the sensation of acceleration as force-feedback by providing the knob with the torque in the same direction as the rotation of the knob. In addition, there is a force-feedback input device giving a clicking sensation as force-feedback by reversing the direction of the torque provided for the knob when the rotation angle of the knob exceeds a predetermined angle.

The force-feedback input device is desired to be reduced in thickness. However, since the force-feedback input device has the structure in which a knob, a rotary encoder, and a motor are disposed in the direction of the shaft of the knob, the size in the direction of the shaft is inevitably great and the reduction in thickness cannot be achieved.

SUMMARY OF THE INVENTION

Considering the above-mentioned situation, it is an object of the present invention to provide a force-feedback input device that can be reduced in thickness in the direction of the shaft of an operating member.

In accordance with the present invention, there is provided a force-feedback input device including a case, a rotatable operating member accommodated in the case, a rotation angle detector detecting a rotation angle of the operating member, an external force applier applying external force to the operating member, and a controller controlling the external force applier according to the rotation angle of the operating member detected by the rotation angle detector. The external force applier is a transparent body including a piezoelectric element and a transparent electrode.

In the present invention having the above structure, when an operator rotates the operating member, the rotation angle of the operating member is detected by the rotation angle detector. According to the detected rotation angle of the operating member, the controller controls the alternating-current applied to the transparent terminal. Then, the piezoelectric element is driven according to the alternating-current applied to the transparent terminal. In this way, external force is applied from the piezoelectric element to the operating member. The operating member gives the operator a predetermined dynamic sensation (force-feedback) according to the rotation angle of the operating member.

In addition, since the external force applier includes a piezoelectric element, the force-feedback input device of the present invention can be reduced in thickness in the direction of the shaft of the operating member, as compared with the force-feedback input device whose external force applier is a motor.

The rotation angle detector may be a rotary encoder, and the operating member may be a code disk of the rotary encoder.

The rotary encoder may have a light emitter and a light receiver, and the code disk may be transparent and layered on the transparent body, the layers of the code disk and the transparent body being disposed between the light emitter and the light receiver opposite each other.

The rotary encoder may have an integrated light emitter and receiver, and the code disk may have a reflective code pattern.

A plurality of projections may be disposed on a surface of the code disk, the surface being touched by an operator during operation.

DESCRIPTION OF THE PREFERRED EMBODIMENTS

The embodiments of the force-feedback input device of the present invention will be described.

[First Embodiment]

First, a first embodiment will be described with reference to FIGS. 1 to 3.

Figure 1:
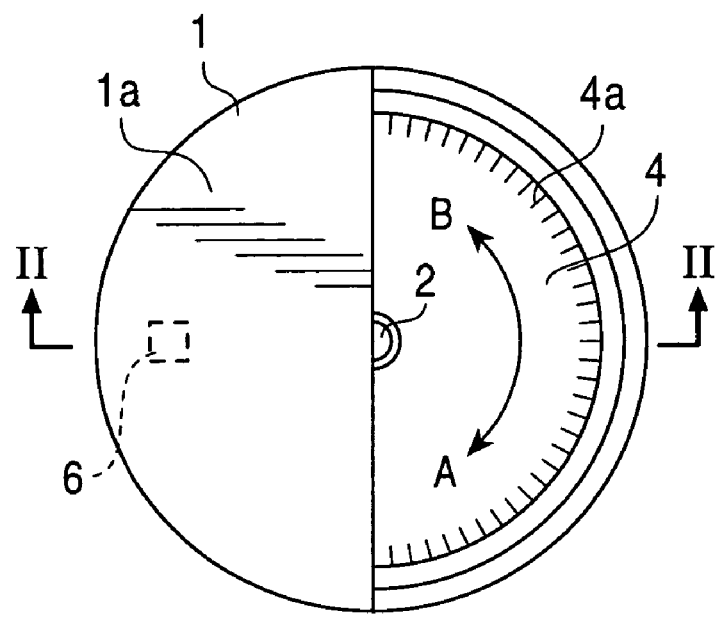
FIG. 1 is a plan view of a force-feedback input device according to a first embodiment of the present invention.
Figure 2:
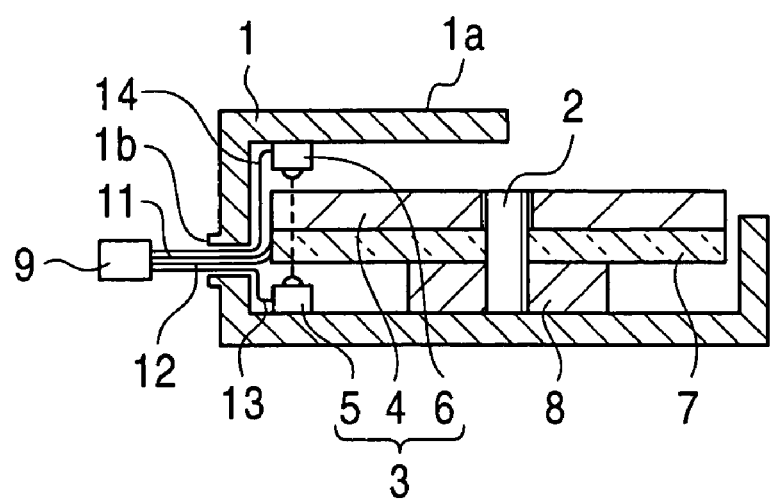
FIG. 2 is a sectional view taken along line II—II of FIG. 1.
Figure 3:
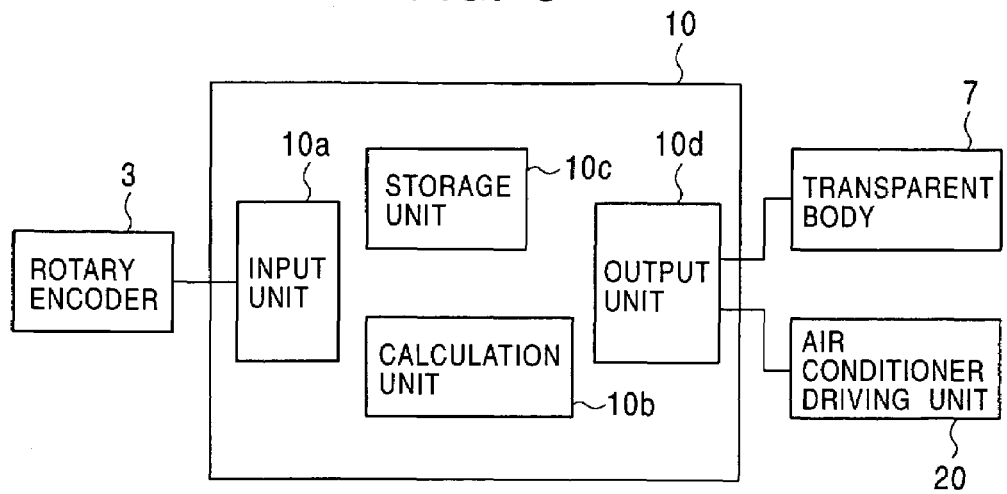
FIG. 3 is a block diagram of an electrical system including a controller of the first embodiment.

FIG. 1 is a plan view of the first embodiment, FIG. 2 is a sectional view taken along line II—II of FIG. 1, and FIG. 3 is a block diagram of an electrical system including a controller of the first embodiment.

The first embodiment is a force-feedback input device that outputs an operation signal to operate an electric device, for example, a car-mounted electric device. The objects of operation are, for example, air flow control and air outlet selection of a car-mounted air conditioner, volume control and tuning of a radio, and volume and tone control of an audio system. Here, the case of air flow control of a car-mounted air conditioner will be described.

In FIGS. 1 and 2, the reference numeral 1 denotes a case. A rotary encoder 3 is provided in the case 1. The rotary encoder 3 has a transparent code disk 4, a light emitter 5, and a light receiver 6. A code pattern 4a is mounted on the rim of the code disk 4. The light emitter 5 emits light towards the code pattern 4a. The light receiver 6 receives the light passing through the code pattern 4a. With the rotation of the code disk 4, the light emitted by the light emitter 5 passes through the code pattern 4a and then is received by the light receiver 6. The light receiver 6 outputs a rotation angle signal corresponding to the rotation angle of the code disk 4.

A half of the upper surface of the code disk 4 is exposed from the case 1, and the other half is covered by a cover portion 1a of the case 1. The code disk 4 is rotatably supported by a shaft 2. The shaft 2 is fixed to a base 8 provided on the bottom of the case 1. In order to operate the device, an operator puts his or her finger on the upper surface of the code disk 4 exposed from the case 1 and gives the code disk 4 torque to rotate it. That is to say, the code disk 4 functions as an operating member. The rigidity of the code disk 4, namely the operating member in the direction of the shaft 2 is determined so that the code disk 4 is hardly bent by the pushing force in the operation.

The code disk 4 is layered on a transparent body 7. The transparent body 7 functions as an external force applier applying external force to the code disk 4 (operating member). The transparent body 7 is a circular film member including a piezoelectric element and a transparent electrode. The thickness of the transparent body 7 is determined so as to be one mm and under. The transparent body 7 is fixed to the shaft 2. The transparent body 7 is provided with alternating-current by the transparent electrode, thereby vibrating. In this way, external force is applied to the code disk 4 (operating member) from the transparent body 7.

Wires 11 and 12 are connected to the transparent electrode of the transparent body 7 and convey the operation signal (alternating-current) output by the controller 10 to be described below. Another wire 13 is connected to the light emitter 5 and conveys the electric power to the light emitter 5. Another wire 14 is connected to the light receiver 6 and conveys the rotation angle signal output by the light receiver 6 to the controller 10. The wires 11 to 14 are connected to a connector 9 through a hole 1b of the case 1. The connector 9 is connected to the controller 10 disposed outside the case 1.

The controller 10 is shown in FIG. 3. In FIG. 3, the reference numeral 20 denotes an object of operation to which the operation signal is output, namely an air conditioner driving unit varying air flow of an air conditioner.

The controller 10 has an input unit 10a, a calculation unit 10b, a storage unit 10c, and an output unit 10d. The rotation angle signal output by the rotary encoder 3 is input into the input unit 10a. According to the rotation angle signal input into the input unit 10a, the calculation unit 10b calculates the value (voltage value) of the operation signal to be output to the air conditioner driving unit 20. In addition, the calculation unit 10b calculates the value (alternating-current value) of the control signal to be output to the transparent body 7. According to the result of the calculation by the calculation unit 10b, the output unit 10d outputs the operation signal to the air conditioner driving unit 20. In addition, the output unit 10d outputs the control signal to the transparent body 7. The storage unit 10c stores a first function, a second function, and a control program. The first function provides the value of the operation signal corresponding to the operation of the air conditioner driving unit 20 for increasing air flow according to increase of the rotation angle of the code disk 4 (operating member) in the direction A. The second function provides the value of the control signal corresponding to the vibration of the piezoelectric element for increasing and decreasing the friction between the code disk 4 and the transparent body 7 at every predetermined rotation angle of the code disk 4 in the direction A. The control program is for operating the controller 10.

The first embodiment operates as will be described below.

When the operator rotates the operating member, namely the code disk 4 in the direction A, the rotation angle of the code disk 4 is detected by the rotary encoder 3, and the rotation angle signal corresponding to the rotation angle is input into the input unit 10a of the controller 10.

The calculation unit 10b of the controller 10 calculates the value of the operation signal from the rotation angle of the code disk 4 detected by the rotary encoder 3, by using the first function stored in the storage unit 10c. Then, the value of the operation signal calculated by the calculation unit 10b is output from the output unit 10d to the air conditioner driving unit 20. This makes the air conditioner driving unit 20 operate to increase the air flow.

At this time, besides calculating the value of the operation signal as above, the calculation unit 10b calculates the value of control signal from the rotation angle of the code disk 4 detected by the rotary encoder 3, by using the second function stored in the storage unit 10c. Then, the value of the control signal calculated by the calculation unit 10b is output from the output unit 10d to the transparent body 7. This makes the friction between the code disk 4 and the transparent body 7 increase and decrease at every predetermined rotation angle of the code disk 4 in the direction A. Through the clicking sensation (force-feedback) accompanying the increase and decrease of the resistance force applied by the operating member, an operator can know the rotated angle of the operating member in the direction of increasing the air flow.

The first embodiment achieves the advantageous effects as will be described below.

Since the external force applier applying external force to the operating member (code disk 4) is a transparent body 7 including a piezoelectric element and a transparent electrode, the force-feedback input device of this embodiment can be reduced in thickness in the direction of the shaft of the operating member, as compared with the force-feedback input device whose external force applier is a motor. Therefore, the size of the installation space can be reduced.

In addition, since the code disk 4 functions as a operating member, the force-feedback input device of this embodiment can be further reduced in thickness in the direction of the shaft of the operating member, and the number of parts can be reduced, as compared with the force-feedback input device in which a code disk and an operating member are separately disposed in the direction of the shaft of the operating member.

Moreover, since the controller 10 is disposed outside the case 1, the case 1 can be downsized.

[Second Embodiment]

Next, a second embodiment will be described with reference to FIGS. 4 and 5.

Figure 4:
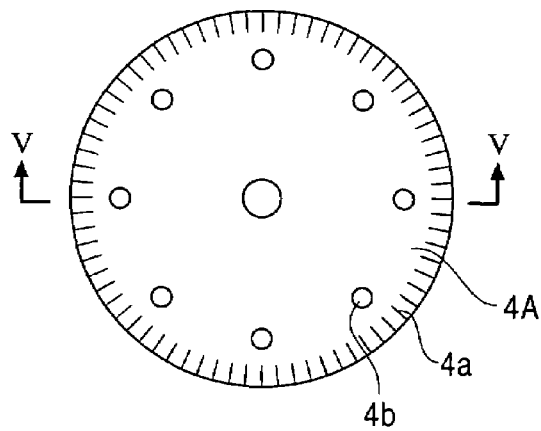
FIG. 4 is a plan view of a code disk included in a second embodiment.

FIG. 4 is a plan view of a code disk included in the second embodiment. FIG. 5 is a sectional view taken along line V—V of FIG. 4.

Figure 5:
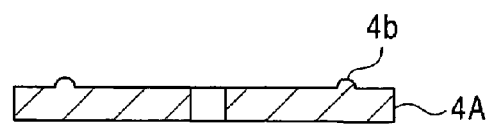
FIG. 5 is a sectional view taken along line V—V of FIG. 4.

As shown in FIGS. 4 and 5, the second embodiment has a code disk 4A with a plurality of projections 4b. This is the difference between the first embodiment and the second embodiment. The other components of the second embodiment are the same as those of the first embodiment.

In the second embodiment, when an operator rotates the code disk 4A (operating member), his or her finger is caught on the projections 4b. Therefore, the operator can rotate the code disk 4A easily.

Although the controller 10 is disposed outside the case 1 in the first and second embodiments, the present invention is not limited to this. The controller 10 may be accommodated in the case 1. In this case, the entire force-feedback input device including the controller 10 can be compact. Whether the controller 10 is to be disposed outside the case 1 or accommodated in the case 1 is determined according to the installation space of the force-feedback input device.

In the first and second embodiments, the rotary encoder 3 has the structure in which the light emitted by the light emitter 5 is received by the light receiver 6 through the code pattern 4a of the code disk 4 or 4A. That is to say, the light emitter 5 and the light receiver 6 are separated. However, the present invention is not limited to this. A rotary encoder may have a code disk with a reflective code pattern, and a light emitter integrated with a light receiver, the light emitted by the light emitter being reflected by the code pattern and received by the light receiver. In this case, since the space for the light emitter and the light receiver can be reduced, the case 1 can be downsized. In addition, the number of parts can be reduced.

What is claimed is:

1. A force-feedback input device comprising:

a case;

a rotatable operating member accommodated in the case;

a rotation angle detector detecting a rotation angle of the operating member;

an external force applier applying external force to the operating member; and a controller controlling the external force applier according to the rotation angle of the operating member detected by the rotation angle detector;

wherein the external force applier is a transparent body including a piezoelectric element and a transparent electrode.

2. The force-feedback input device according to claim 1, wherein the rotation angle detector is a rotary encoder, and the operating member is a code disk of the rotary encoder.

3. The force-feedback input device according to claim 2, wherein the rotary encoder has a light emitter and a light receiver, and the code disk is transparent and layered on the transparent body, the layers of the code disk and the transparent body being disposed between the light emitter and the light receiver opposite each other.

4. The force-feedback input device according to claim 2, wherein the rotary encoder has an integrated light emitter and receiver, and the code disk has a reflective code pattern.

5. The force-feedback input device according to claim 2, wherein a plurality of projections are disposed on a surface of the code disk, the surface being touched by an operator during operation.

* * * * *